US007850129B2

(12) United States Patent
Neuenberger

(10) Patent No.: US 7,850,129 B2
(45) Date of Patent: Dec. 14, 2010

(54) TRASH BAG HOLDER

(76) Inventor: Charles Ronald Neuenberger, 11 Dark Star Ct., Edgewater, MD (US) 21037

( * ) Notice: Subject to any disclaimer, the term of this patent is extended or adjusted under 35 U.S.C. 154(b) by 316 days.

(21) Appl. No.: 11/941,536

(22) Filed: Nov. 16, 2007

(65) Prior Publication Data

US 2009/0127408 A1 May 21, 2009

(51) Int. Cl.

| | |
|---|---|
| ***A63B 55/04*** | (2006.01) |
| ***A47G 23/02*** | (2006.01) |
| ***F16M 11/00*** | (2006.01) |
| ***A47F 5/00*** | (2006.01) |
| ***B65D 25/14*** | (2006.01) |
| ***B65D 35/14*** | (2006.01) |
| ***B65D 90/00*** | (2006.01) |

(52) U.S. Cl. ...................... 248/97; 220/908; 220/908.1; 220/495.08; 220/495.06; 220/495.01; 248/146; 248/689; 248/309.1; 248/316.81

(58) Field of Classification Search ................. 248/907, 248/97, 98, 100, 146, 689, 309.1, 316.81; 220/908, 908.1, 495.08, 495.06, 495.01, 220/23.86, 28.83; D34/1
See application file for complete search history.

(56) References Cited

U.S. PATENT DOCUMENTS

| | | | | |
|---|---|---|---|---|
| 4,270,788 | A * | 6/1981 | Overholt | 294/55 |
| 4,358,083 | A * | 11/1982 | Haubrich | 248/545 |
| 5,088,667 | A * | 2/1992 | Olson | 248/101 |
| 5,393,022 | A * | 2/1995 | Palumbo | 248/95 |
| 5,476,187 | A * | 12/1995 | Marisco | 220/495.08 |
| 5,588,622 | A * | 12/1996 | Gordon, Sr. | 248/101 |
| 5,662,238 | A * | 9/1997 | Sarno | 220/495.11 |
| 6,017,069 | A * | 1/2000 | Imms et al. | 294/1.1 |
| 6,076,782 | A * | 6/2000 | Alderman | 248/97 |
| 6,092,767 | A * | 7/2000 | Schrager | 248/98 |
| 6,176,455 | B1 * | 1/2001 | Ma | 248/101 |
| 6,450,461 | B1 | 9/2002 | Lohmann | |
| 2002/0100845 | A1 * | 8/2002 | Green | 248/101 |
| 2006/0266893 | A1 * | 11/2006 | Kelley | 248/97 |

* cited by examiner

*Primary Examiner*—J. Allen Shriver, II
*Assistant Examiner*—Christopher Garft
(74) *Attorney, Agent, or Firm*—The Maubury Law Group, PLLC

(57) ABSTRACT

A trash bag holder detachably mounted on a wall having capability to be used in sweeping debris. The device is assembled from a flexible rod handle, end caps, a bag holder base, rod handle clips, and trash bag holder brackets. When fully assembled the trash bag holder maintains a trash bag in an open position. Rod handle clips maintain the trash bag onto trash bag holder brackets. The trash bag holder brackets may be selectively clipped together and attached to the base to form a unitary assembly. A sloped area on the base allows the unit to be used as a scoop to facilitate the cleanup of debris while the base also allows the unit to be removably attached to a wall or door where it maintain a trash bag in a vertical open position without the need for a rigid container.

14 Claims, 10 Drawing Sheets

TRASH BAG HOLDER

BACKGROUND AND SUMMARY

While not very sexy, it is readily apparent that plastic trash bags, also referred to as trash can liners, are an integral part of life. These bags, (collectively referred to herein as "trash bags") can be manufactured as a wide variety of flexible plastic products. For example, trash bags can be made from high density polyethylene (HDPE) low density polyethylene (LDPE) and linear low density polyethylene (LLDPE). All of these trash bag materials can be of varying thickness (usually measured in mils) and can be of a wide variety of colors and transparencies. Typically such trash bags are used in trash containers as liners and are used without any container and simply carried to a location where trash is to be deposited therein. Trash bags may also be made of cloth and paper, depending on the use of the bag.

In cases where the user does not have a ridged structure, such as a trash can, use of trash bags can be problematic and inconvenient for a user. Further, use of a trash bag by itself for sweeping up smaller debris is difficult if not impossible since the trash bag itself has no rigidity and will not stay in place when a user attempts to sweep things into it. It would thus be useful to have an apparatus that allows a trash bag to be maintained in an open position during clean up or sweeping operations. Such an apparatus would also allow a trash bag to be attached to a wall so that it can be maintained in a vertical open position without the need for a trash container.

LIST OF FIGURES

DETAILED DESCRIPTION

Figure 1:
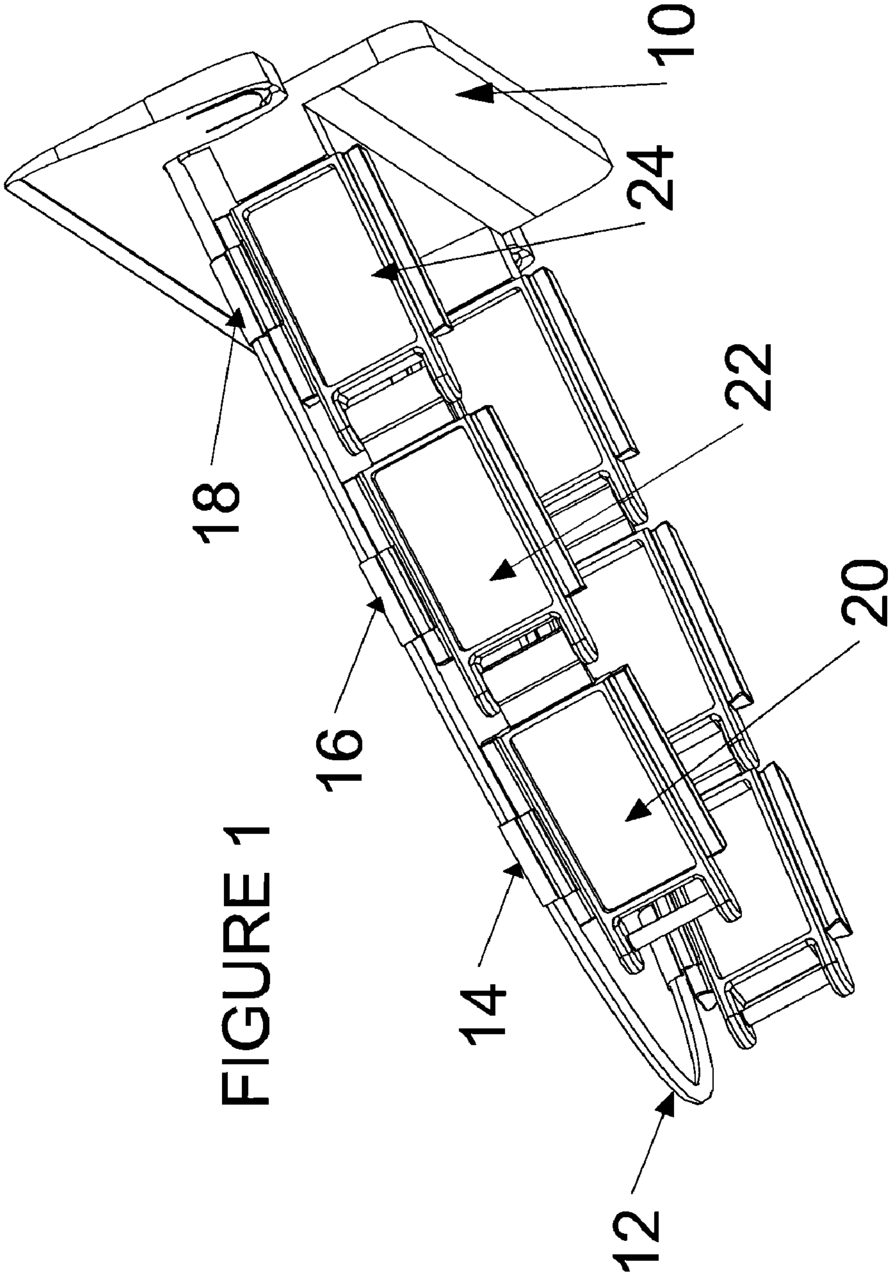
FIG. 1 illustrates the fully assembled trash bag holder according to an embodiment hereof.

Referring to FIG. 1 an overview of the trash bag holder apparatus is illustrated. Generally the trash bag holder apparatus comprises a base 10, a rod handle 12, bag clips 14, 16, and 18, bag holder brackets 20, 22, and 24 and end caps (not shown in this illustration) for retaining rod holder 12 onto base 10. It should be noted that rod handle 12 is inserted through a cylindrical passage on each handle clip during assembly. Therefore, rod handle 12 will have a plural number of handle clips on rod handle 12.

During use, the user will take the bag holder bracket 24, for example, drape a top portion of the trash bag over bag holder bracket 24 and then clip the top portion of bag holder bracket 24 to handle clip 18 thereby pinching the top portion of the trash bag between the bag holder bracket 24 and hand clip 18. As will be shown below, handle clip 18 is flexible and expands to detachably engage the top portion of bag holder bracket 24 and the top portion of the trash bag. Bag holder bracket 22 can then be attached to other bag holder brackets that have similarly been clipped onto respective bag holder clips and inserted into the bag holder base.

This procedure of draping a trash bag over the bag holder bracket, engaging the bag holder bracket with previously placed bag holder brackets and engaging the top of any bag holder bracket with a handle clip is continued until the top of the trash bag is engaged and retained in place around rod handle 12.

Figure 2:
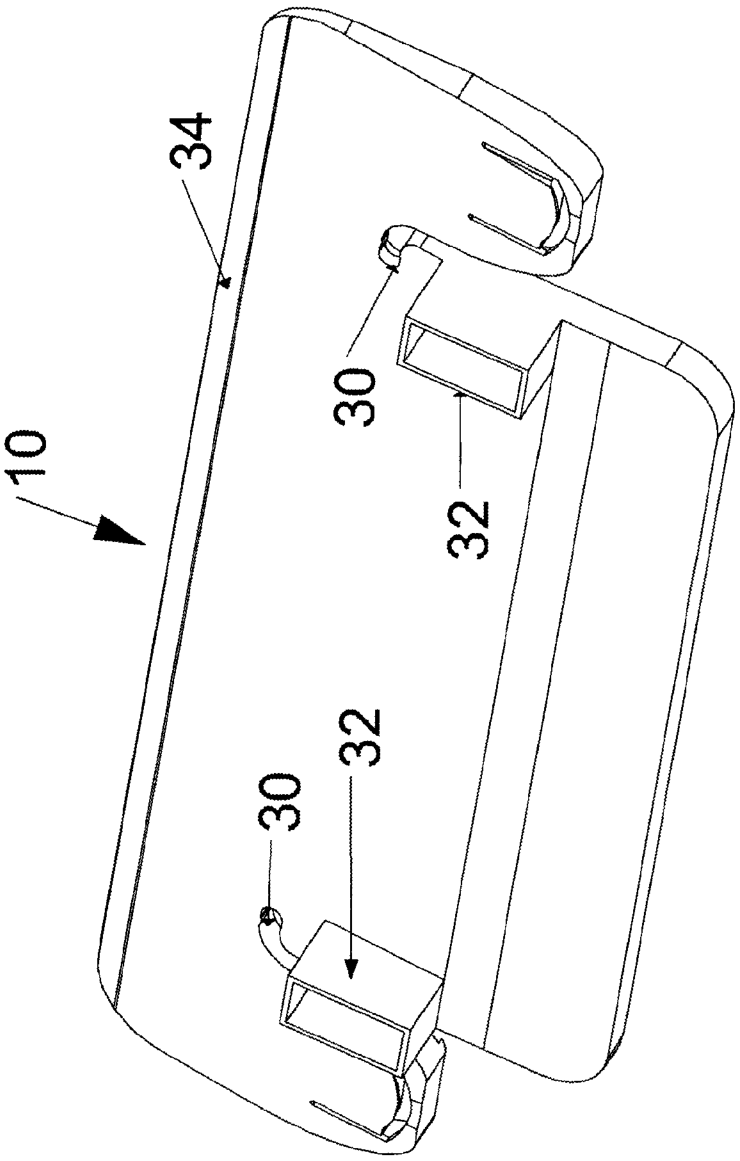
FIG. 2 illustrates the trash bag holder base according to an embodiment hereof.

Referring now to FIG. 2 the bag holder base is illustrated in further detail. Bag holder base 10 comprises rod handle slots 30 into which the rod handle with attached end caps is threaded. Bag holder base 10 also comprises rigid slots which are dimensioned to engage bag holder brackets (20, 22 and 24) which, when attached to the rod holder adds further rigidity to the entire assembly. Bag holder bracket slots 32 are disposed on either side of the bag holder base 10. The spacing between rod holder slots 30 dictates the width of the trash bag opening once the trash bag is attached to the rod handle.

Bag holder base 10 also comprises a sloped area 34 that allows the entire assembly comprising the rod handle, trash bag, and base to be used as a trash scoop, so that debris may be swept into the assembled unit with the bag attached. The entire bag holder bracket 10 is then mounted on a wall using a wall bracket (see, FIG. 2A) so that the assembled unit with the trash bag attached can be installed on a wall, yet be removed for leaf and other debris clean up purposes.

Figure 2A:
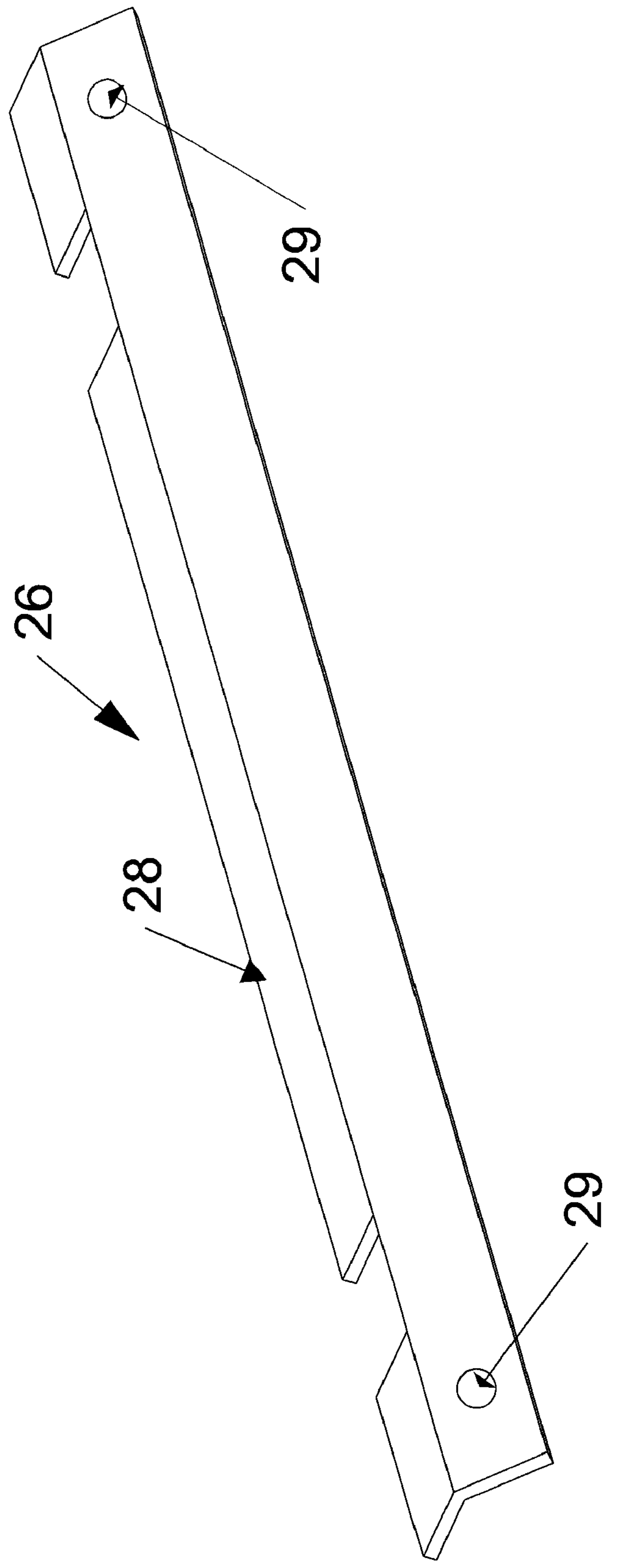
FIG. 2A illustrates a wall mounting bracket according to an embodiment hereof.

FIG. 2A illustrates a wall mounting bracket according to an embodiment hereof. Wall mounting bracket 26 comprises mounting holes 29 and a sloped area 28. Sloped area 28 engages the back of bag holder base 10 (see, FIG. 2B) to support the wall mounting bracket when in a hanging position.

Figure 2B:
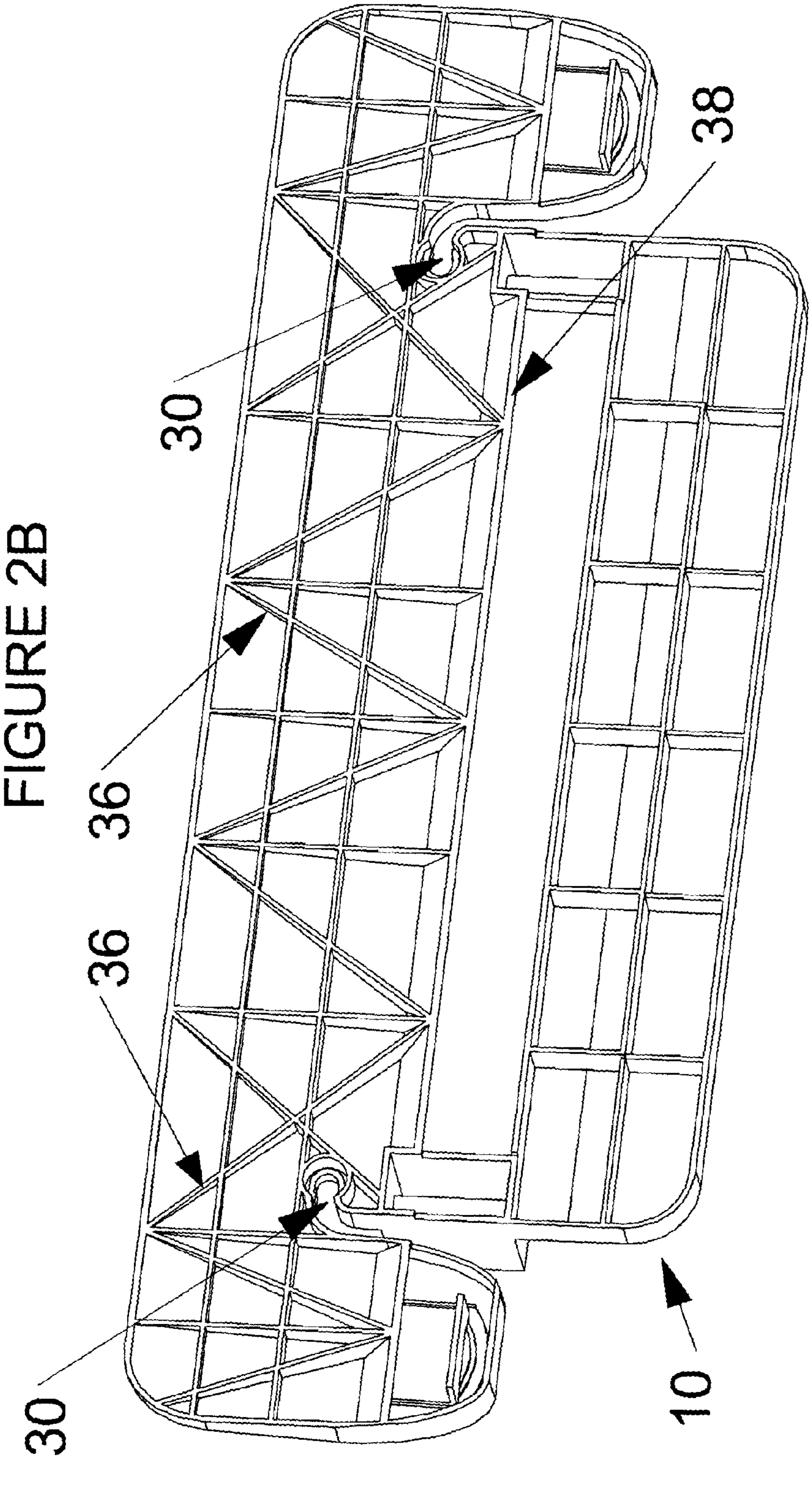
FIG. 2B illustrates the back of the bag holder base according to an embodiment hereof.

FIG. 2B illustrates the back of the bag holder base according to an embodiment hereof. As can be seen from this illustration (FIG. 2B) the bag holder base comprises reinforcing structures 36 throughout to add further strength to the bag holder base, yet maintain a light weight structure for the base. The reinforcing structures 36 extend to and are affixed to the top of supporting plate 38. Supporting plate 38 is sloped upward at the same angle as sloped area 28 of mounting bracket 26. This configuration of supporting plate 38 and sloped area 28 allows bag holder base 10 to rest securely on wall mounting bracket 26 while being easily removable.

In an embodiment, the entire bag holder base is injection molded as a single unitary structure which can be made from a variety of strong polymers. The material used for the base and the method of forming the base are not meant as limitations. For example, the base could be made using various processes from a variety of plastics, metal, or other ridged materials that can be used as a base structure and known in the art.

Figure 3:
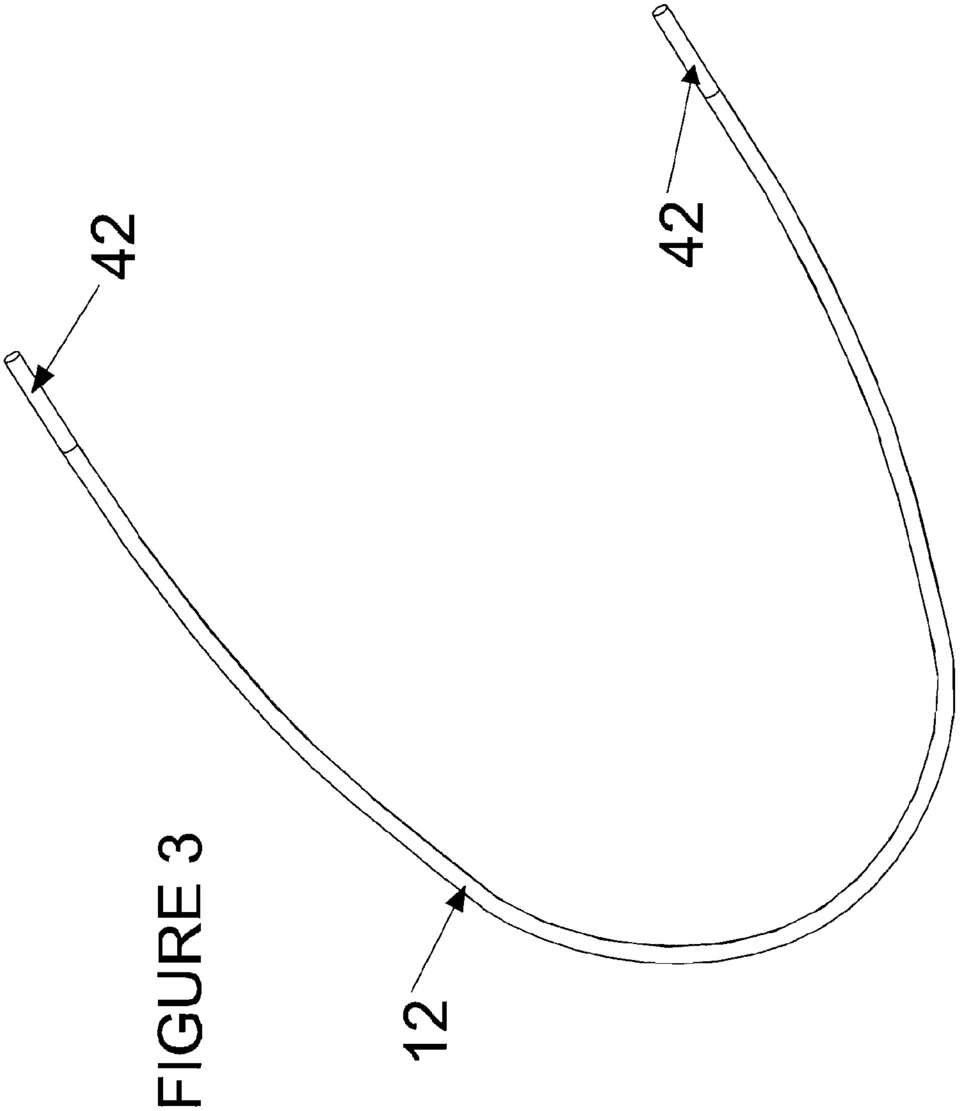
FIG. 3 illustrates the rod handle according to an embodiment hereof.

Referring now to FIG. 3 the rod handle is illustrated. Rod handle 12 generally comprises a flexible rod material. Rod handle 12 may be constructed from a flexible polymer, or metal. The ends of rod handle 12 comprise a slightly roughened area onto which end caps (see, FIG. 4) are pressure fit to allow rod handle 12 to be retained in base 10.

Figure 4:
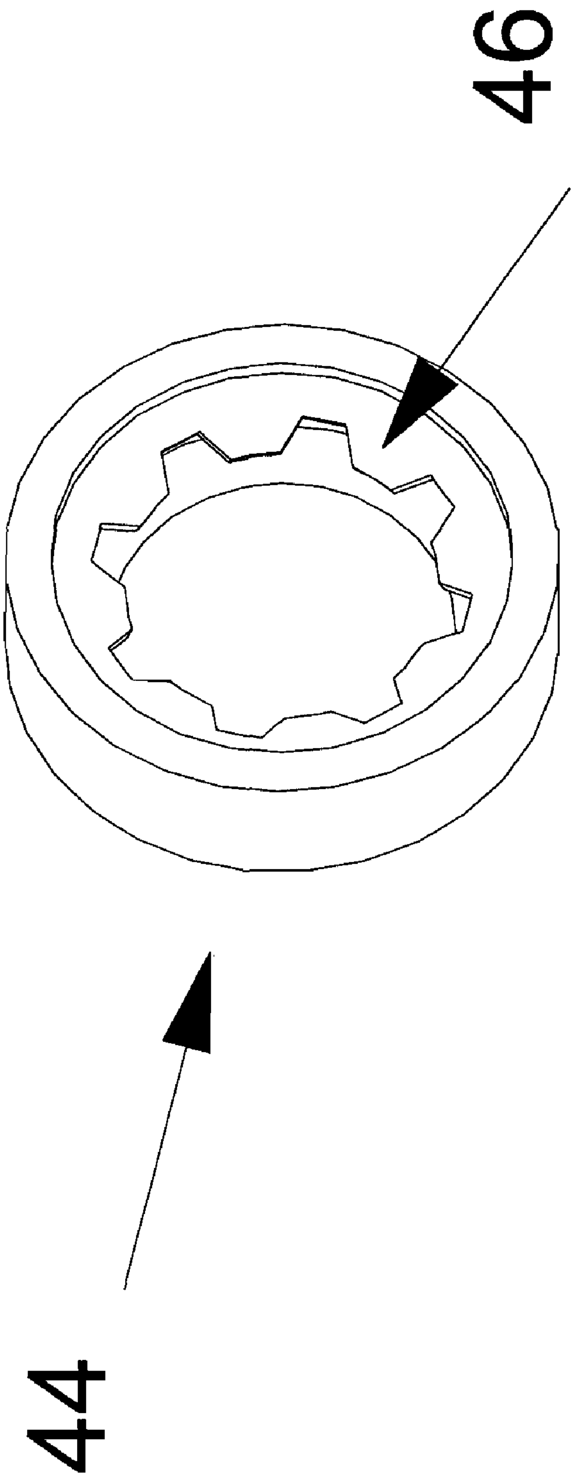
FIG. 4 illustrates the end cap according to an embodiment hereof.

FIG. 4 illustrates an end of cap according to an embodiment hereof. End cap 44 is pressure fit onto the ends of rod handle 12. End cap 44 comprises an internal pressure fit ring 46 which, when engaged upon the ends of rod handle 12 grip rod handle 12 securely. Rod handle 12 with rod cap 44 attached can then be inserted into holder slots 30 on base 10 where it will be retained in place by virtue of rod cap 44.

Figure 5:
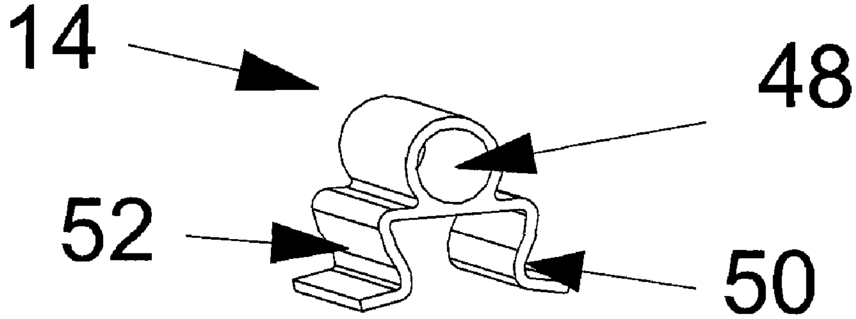
FIG. 5 illustrates a handle clip according to an embodiment hereof.

FIG. 5 illustrates a handle clip according to an embodiment. It should be noted that handle clip 14 is but one of a plurality of handle clips that comprise the final bag holder assembly (see, FIG. 1). Handle clip 14 is made from a flexible polymer material, although this is not meant as a limitation. Other flexible material such as aluminum or other metals may also be used for the purposes described herein. Handle clip 14 comprises a top portion having a cylindrical channel 48 therethrough. The purpose of the cylindrical channel 48 is to allow handle clip 14 to be threaded onto rod holder 12 during the assembly of the bag holder apparatus. The lower portion of bag holder 14 comprises two flexible flanges 50, 52 which flexibly engage the top portion of the bag holder brackets and a layer of a garbage bag. (See FIG. 6). Multiple number of handle clips are attached to rod handle 12 so that subsequent bag holder brackets can be attached to all of these clips thereby maintaining a trash bag around the length of rod handle 12.

Figure 6:
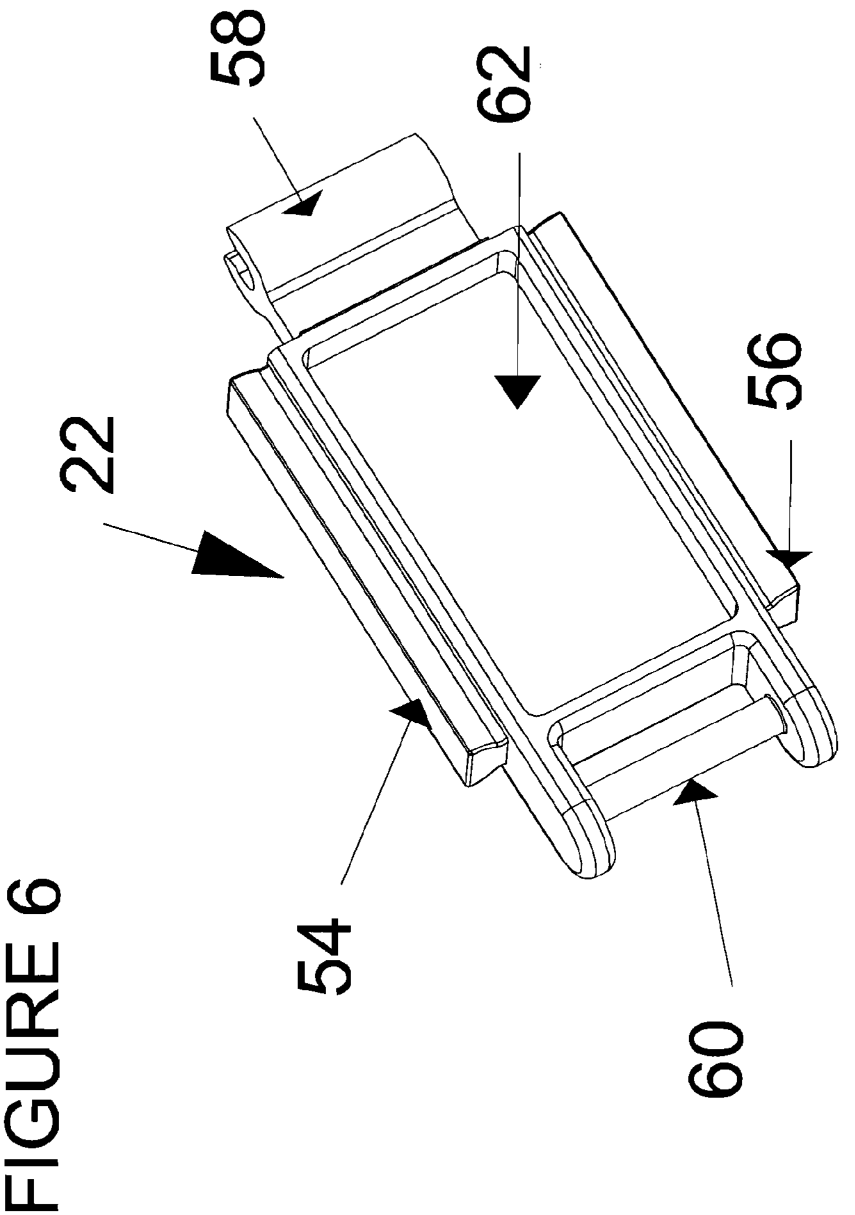
FIG. 6 illustrates the bag holder bracket according to an embodiment hereof.

FIG. 6 illustrates a bag holder bracket according to an embodiment hereof. It should be noted that the description in this figure is illustrative only. It is not meant to limit the number of bag holder brackets 22 that are used in the final assembly (see, FIG. 1). Indeed, multiple bag holder brackets will be used to maintain the opening of a trash bag that is used with the bag holder apparatus. Bag holder bracket 22 is also made from a high impact polymer, although this is not meant as a limitation. Again, this part may be made from metal or other ridged material so long as it functions for the purposes described herein. Bag holder bracket 22 comprises engagement sections 54, 56, dispose along the top and bottom portions of bag holder bracket 22. These engagement sections, 54, 56 are wider at the outside portions and more narrow at the portions that meet the body of bag holder bracket 22. In this manner engagement sections 54, 56 can engage the flexible flanges of handle clip 14 (52, 50, see FIG. 5).

Bag holder bracket 22 further comprises an integral vertical clip 58 on one end and vertical rod 60 on the opposite end. The purpose of vertical clip 58 is to permit a bag holder bracket 22 to engage the corresponding rod of an additional bag holder bracket so that the one bag holder bracket can be connected to another if desired. Similarly, the purpose of vertical rod 60 on bag holder bracket 22 is to allow the engagement of the clip portion a subsequent bag holder bracket so that multiple bag holder brackets can, if desired, be connected together, or allowed to "float" on rod handle 12.

The curvature of rod handle 12 in conjunction with the structure of the bag holder brackets allows the trash bag holder apparatus to accommodate a large variation in trash bag sizes. The bag holder brackets can be adjusted along rod handle 12 to accommodate different size bags and to permit a user to adjust the bag opening to suit his or her preferences. The presence of vertical clip 58 and vertical rod 60 allows brackets to be connected together and moved around the rod handle as a unit to further adjust for different bag sizes.

Bag holder bracket 22 also comprises a flattened area 62 which serves two purposes. First, it provide additional rigidity to the entire bag holder bracket structure and at the same time allows a small surface area for the placement of an advertisement, or logo which may be embossed or applied to the part during manufacture. In an embodiment, this bag holder bracket (and others similar to it) are injection molded and comprise a unitary piece of plastic or metallic material. The material used for the bag holder bracket and the method of forming the bag holder bracket are not meant as limitations.

Figure 6A:
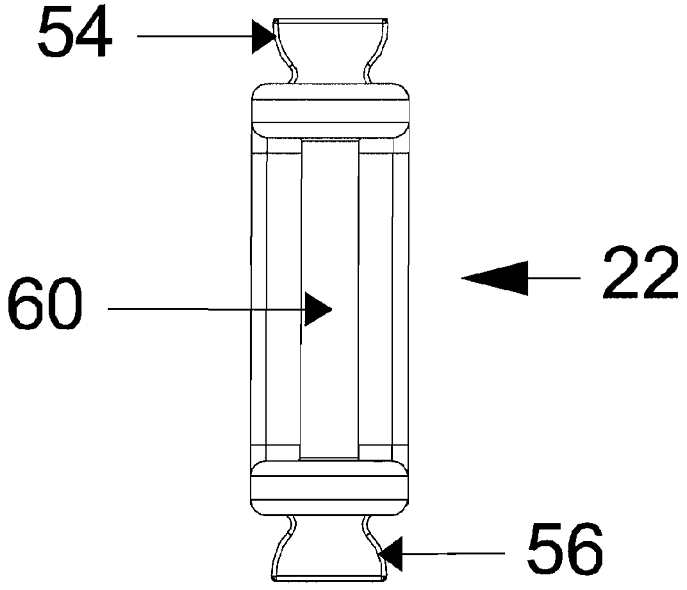
FIG. 6A illustrates an end-on view of a bag holder bracket according to an embodiment hereof.

FIG. 6A illustrates an end on view of a bag holder bracket according to an embodiment hereof. As can be seen from this particular view, engagement areas 54 and 56 have a roughly trapezoidal cross section that engages the flexible flanges of handle clip 14 (see FIG. 5, 50, 52) when a trash bag is draped over the bag holder bracket. It should also be noted that the cross section of bag holder bracket 22 is symmetrical. Therefore, a user does not have to pay attention to a top or bottom portion when draping a bag over the bag holder bracket for subsequent engagement with a handle clip. This allows for ease of assembly. In this FIG. 6A, vertical rod 60 is also illustrated.

Referring again to FIG. 1, the assembly of the bag holder apparatus is discussed. In an embodiment, the bag holder apparatus comes to a consumer in a disassembled fashion. In assembling the unit, the user takes flexible rod handle 12 and first attaches end caps (see FIG. 4, 44) to each end of rod handle 12 (see FIG. 3, 42).

Prior to attaching end caps to rod handle 12 the user places a plurality of handle clips (see FIG. 5) onto rod handle 12. The number of handle clips is illustrated in FIG. 1 as a total of six, however this is not meant as a limitation. The number of handle clips that are placed onto flexible rod handle 12 is a function of the size of the trash bag and the overall dimension of the bag holder apparatus. The flexible rod handle 12 is inserted into the cylindrical channel 48 (see FIG. 5) of each handle clip. After all handle clips are in place, the final rod cap is attached to the flexible rod handle.

After the rod handle, handle clips, and rod caps are in place, the ends of the rod handle 12 are placed into the rod handle slots 30 of base 10. Mounting bracket 26 is attached to a wall or a door (see, FIG. 2A). Base 10 can then be removably attached to a wall bracket for subsequent storage. It should be noted that prior to placing a bag on the bag holder apparatus, a user may elect to clip the bag holder brackets together and clip that assembly to corresponding handle clips to permit the entire unit without a bag attached to be stored and attached to a wall for subsequent use.

When the user desires to attach a trash bag to the entire unit, the user simply disengages bag holder brackets from their corresponding handle clips, drapes the top portion of a trash bag over the bag holder brackets and then clips the bag holder brackets to corresponding handle clips. If desired, the bag holder brackets may be selectively connected together. In this fashion the opening of the trash bag is maintained by a combination of the dimension of the flexible rod handle 12 and bag holder brackets and bag holder clips.

Figure 7:
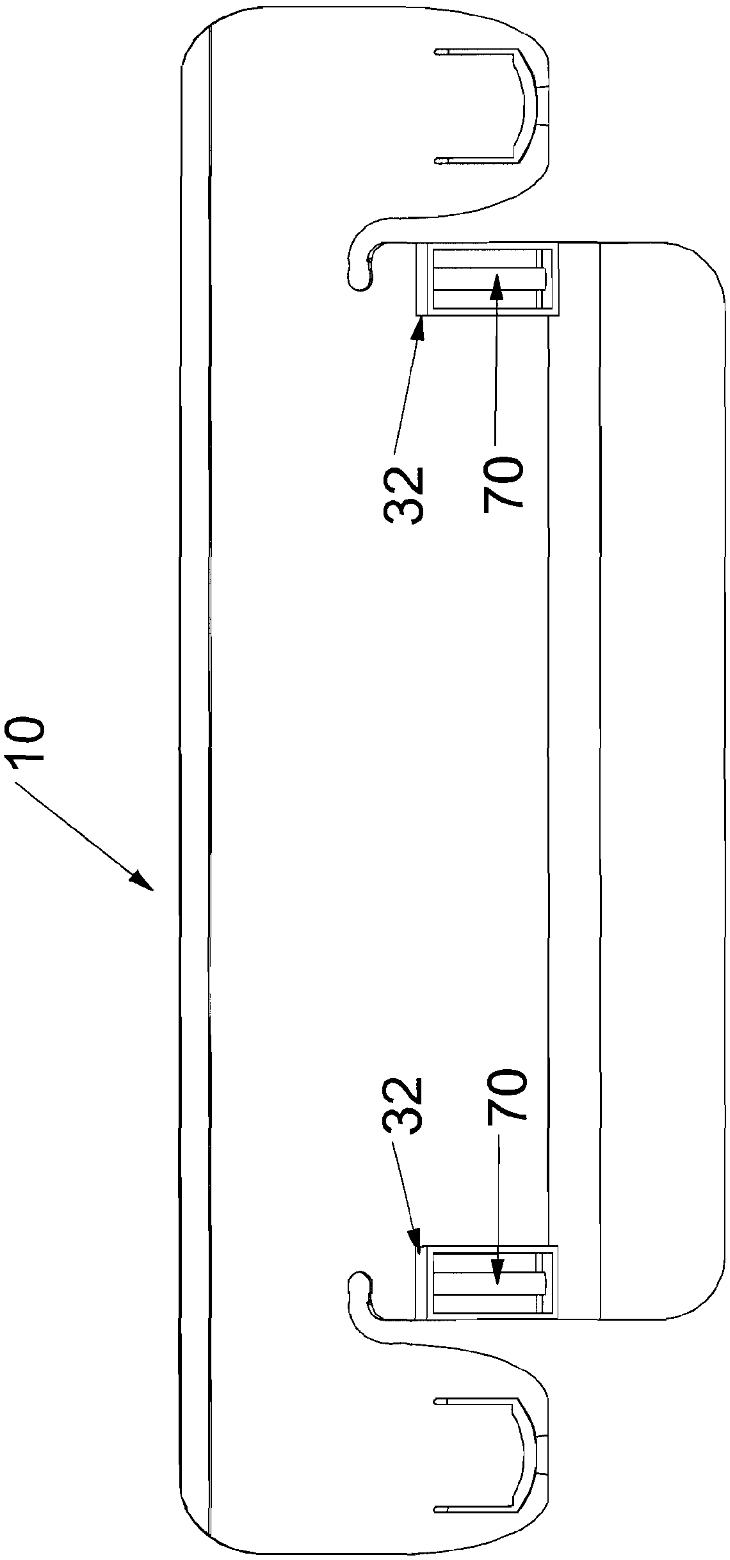
FIG. 7 illustrates a frontal view of a trash bag holder base according to an embodiment hereof.

FIG. 7 illustrates a frontal view of a trash bag holder base according to an embodiment hereof. Bag holder bracket slots 32 are disposed on either side of the bag holder base 10. Each bag holder bracket slot 32 comprises a vertical rod 70. The vertical rods 70 are engaged by a vertical clip 58 of a bag holder bracket 22 (see FIG. 6A) to maintain the rigidity of the entire structure and to keep at least a portion of the trash bag tightly against the base bracket.

Subsequently, a user can remove the entire assembly from a wall bracket and, holding rod holder 12, simply place the wall bracket on the ground and, using the sloped area 34 (see FIG. 2) sweep debris directly into the opening that is maintained by handle rod 12 and bag holder bracket and bag holder clips.

It will also be understood that the invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A trash bag holder apparatus comprising:

a flexible rod handle having ends;

a plurality of rod handle clips positioned on the rod handle, wherein the rod handle clips comprise a channel permitting the rod handle clips to slide freely along the rod handle;

end caps rigidly affixed to the rod handle ends;

a base having rod handle slots, the base attached to the rod handle by sliding the rod handle with the end caps attached into the rod handle slots; and a plurality of bag holder brackets, detachably connected to the corresponding plurality of rod handle clips, wherein each of the plurality of bag holder brackets comprises:

a proximate end comprising an integral vertical clip; and a distal end comprising an integral vertical rod, wherein the integral vertical rod is dimensioned to detachably engage the integral vertical clip, and whereby a first bag holder bracket may be detachably connected to a second bag holder bracket by engaging the integral vertical rod of the first bag holder bracket into the vertical clip of the second bag holder bracket.

2. The trash bag holder apparatus of claim 1, wherein each rod handle clip comprises a flexible portion dimensioned to detachably engage the plurality of bag holder brackets.

3. The trash bag holder of claim 2 wherein:

each bag holder bracket comprises an engagement section dimensioned to detachably engage the flexible portions of the rod handle clips, and whereby a trash bag may be removably retained between the bag holder bracket and the rod handle clips.

4. The trash bag holder of claim 2, wherein the channel has a cross-section selected from the group consisting of round, elliptical, triangular and rectangular.

5. The trash bag holder of claim 1, wherein the flexible rod handle comprises a flexible material selected from the group consisting of a polymer and a metal.

6. The trash bag holder of claim 1, wherein the plurality of rod handle clips comprises a flexible material selected from the group consisting of a polymer and a metal.

7. The trash bag holder of claim 1, wherein the plurality of bag holder brackets comprises a flexible material selected from the group consisting of a polymer and a metal.

8. The trash bag holder of claim 1, wherein the base comprises a material selected from the group consisting of a polymer and a metal.

9. The trash bag holder of claim 1, wherein the base is formed by injection molding.

10. A trash bag retention assembly comprising:

a bag holder bracket, wherein the bag holder bracket comprises:

an engagement section;

a proximate end comprising an integral vertical clip; and a distal end comprising an integral vertical rod, wherein the integral vertical rod is dimensioned to detachably engage the integral vertical clip, and whereby a first bag holder bracket may be detachably connected to a second bag holder bracket by engaging the integral vertical rod of the first bag holder bracket into the vertical clip of the second bag holder bracket; and a rod handle clip comprising a flexible portion, wherein:

the engagement section of the bag holder bracket and the flexible portion of the rod handle clip are dimensioned to detachably engage whereby a trash bag may be removably retained between the bag holder bracket and the rod handle clip.

11. The trash bag retention assembly of claim 10, wherein the bag holder bracket comprises a flexible material selected from the group consisting of a polymer and a metal.

12. The trash bag retention assembly of claim 10, wherein the rod handle clip comprises a flexible material selected from the group consisting of a polymer and a metal.

13. The trash bag retention assembly of claim 10, wherein the rod handle clip comprises a channel for slidably engaging the rod handle clip with a supporting member.

14. The trash bag retention assembly of claim 13, wherein the channel has a cross-section selected from the group consisting of round, elliptical, triangular and rectangular.

* * * * *